United States Patent
Whipple et al.

(10) Patent No.: US 7,216,142 B2
(45) Date of Patent: May 8, 2007

(54) NETWORK APPLICATION PROGRAM INTERFACE FACILITATING COMMUNICATION IN A DISTRIBUTED NETWORK ENVIRONMENT

(75) Inventors: Mark B Whipple, Dallas, TX (US); Ranjit N Notani, Irving, TX (US)

(73) Assignee: i2 Technologies US, Inc., Dallas, TX (US)

( * ) Notice: Subject to any disclaimer, the term of this patent is extended or adjusted under 35 U.S.C. 154(b) by 837 days.

(21) Appl. No.: 09/930,673

(22) Filed: Aug. 14, 2001

(65) Prior Publication Data

US 2002/0038340 A1 Mar. 28, 2002

Related U.S. Application Data

(60) Provisional application No. 60/225,366, filed on Aug. 14, 2000.

(51) Int. Cl.
*G06F 15/16* (2006.01)
*G06F 7/00* (2006.01)

(52) U.S. Cl. .......................................... 709/203; 707/9
(58) Field of Classification Search ............... 719/311, 719/318, 313, 328; 370/230, 230.1, 229, 370/300; 713/152, 168
See application file for complete search history.

(56) References Cited

U.S. PATENT DOCUMENTS

| | | | | |
|---|---|---|---|---|
| 5,329,619 A | * | 7/1994 | Page et al. | 709/203 |
| 5,339,434 A | | 8/1994 | Rusis | 395/700 |
| 5,719,942 A | * | 2/1998 | Aldred et al. | 709/228 |
| 5,926,636 A | * | 7/1999 | Lam et al. | 719/313 |
| 5,987,504 A | * | 11/1999 | Toga | 709/206 |
| 6,066,181 A | | 5/2000 | DeMaster | 717/5 |
| 6,304,967 B1 | * | 10/2001 | Braddy | 713/150 |
| 6,381,579 B1 | * | 4/2002 | Gervais et al. | 705/8 |
| 6,523,022 B1 | * | 2/2003 | Hobbs | 707/3 |
| 6,621,505 B1 | * | 9/2003 | Beauchamp et al. | 715/764 |
| 2002/0023037 A1 | * | 2/2002 | White, Jr. | 705/37 |
| 2002/0046301 A1 | * | 4/2002 | Shannon et al. | 709/328 |
| 2003/0121000 A1 | * | 6/2003 | Cooper et al. | 715/513 |
| 2005/0256955 A1 | * | 11/2005 | Bodwell et al. | 709/224 |

OTHER PUBLICATIONS

PCT, Notification of Transmittal of the International Search Report or the Declaration, 4 pages, Nov. 19, 2001.

* cited by examiner

*Primary Examiner*—Nathan J. Flynn
*Assistant Examiner*—Ashok Patel
(74) *Attorney, Agent, or Firm*—Booth Udall, PLC

(57) ABSTRACT

A request broker receives a request from a client, including a description of a method and parameters to be used in executing the method. The parameters have one of multiple acceptable native formats. The request broker determines the native format and communicates the parameters in the native format to a selected one of multiple translators for translation to an internal format, where each translator is associated with a different native format. The request broker communicates the parameters in the internal format to an application server system to enable execution of the method, receives a return value from the application server system reflecting execution of the method, communicates the return value in the internal format to the selected translator for translation to the native format, generates a reply including the description of the method and the return value in the native format, and communicates the reply to the client.

23 Claims, 4 Drawing Sheets

ND APPLICATION PROGRAM
NETWORK APPLICATION PROGRAM INTERFACE FACILITATING COMMUNICATION IN A DISTRIBUTED NETWORK ENVIRONMENT

RELATED APPLICATION

This application claims the benefit under 35 U.S.C. § 119(e) of U.S. Provisional Application Ser. No. 60/225,366, filed Aug. 14, 2000 for "System and Method for Describing and Executing an Application Program Interface Over the Internet."

TECHNICAL FIELD OF THE INVENTION

The invention relates in general to communications, and more particularly to a network application program interface (API) that facilitates communication within a distributed network environment.

BACKGROUND OF THE INVENTION

As the commercial significance of the Internet has increased, business-to-consumer ("B2C"), business-to-business ("B2B"), and other electronic marketplaces have become increasingly prevalent. Each marketplace typically uses a different set of software applications, with possibly different underlying technologies, to provide the communication capabilities that potential users of the marketplace expect. For example, a marketplace hub server at one enterprise may wish to communicate with another marketplace hub server at a different enterprise. Additionally, other types of servers may want to participate in marketplace transactions with a marketplace hub server. Such servers may be associated with legacy systems at remote enterprises, which may or may not be "Internet aware." Lack of a mechanism providing effective integration of these disparate systems can unduly restrain or even prohibit effective marketplace participation by such systems and associated users.

SUMMARY OF THE INVENTION

According to the present invention, one or more problems and disadvantages associated with communication in distributed network environments may be reduced or eliminated.

In one embodiment of the present invention, a computer-implemented system includes a request broker that receives a network API request component from a client, the network API request component including a description of a system API method to be called and one or more parameters to be used in executing the system API method. The parameters have one of multiple acceptable native formats. The request broker determines the native format of the parameters and communicates the parameters in the native format to a selected one of a collection of translators for translation of the parameters from the native format to an internal format, each translator being associated with a different native format. The request broker communicates the parameters in the internal format to an application server system to enable execution of the system API method according to the parameters and receives a return value from the application server system in the internal format reflecting the execution of the system API method according to the parameters. The request broker communicates the return value in the internal format to the selected translator for translation of the return value from the internal format to the native format, generates a network API reply component that comprises the description of the system API method that was called and the return value in the native format, and communicates the network API reply component to the client.

Certain embodiments of the present invention may provide one or more technical advantages over prior communication techniques. Certain embodiments of the invention may provide a mechanism for describing and executing an application program interface (API) in a distributed network environment such as the Internet, including providing the ability to receive and return values from API calls and to return exception and deprecation notices when appropriate. Certain embodiments of the invention may allow disparate remote clients to interact with a hub system using disparate corresponding data representations, such as Extensible Markup Language (XML), Electronic Data Interchange (EDI), relational, serialized object (e.g., JAVA), or relational formats, using a generic cross-firewall API mechanism. This may allow integration with these disparate remote clients in a generic manner, allowing such disparate remote clients to directly interact with the hub system without requiring implementation of interaction or communication protocols tailored for each disparate remote client. This may further allow appropriate planning or other collaborative engine capabilities to be exposed in a standard fashion to integrators associated with such disparate remote clients. Certain embodiments of the invention may provide execution of "document-based" or other asynchronous API calls as well as "function based" or other synchronous API calls, allowing bulk or transactional interactions to be dealt with efficiently, and may also support a "versioned" API concept.

Systems and methods incorporating one or more of these or other advantages may be well suited for modern commercial transaction environments such as those associated with electronic marketplaces. Other technical advantages may be readily apparent to those skilled in the art from the figures, descriptions and claims included herein.

DETAILED DESCRIPTION OF THE INVENTION

Figure 1:
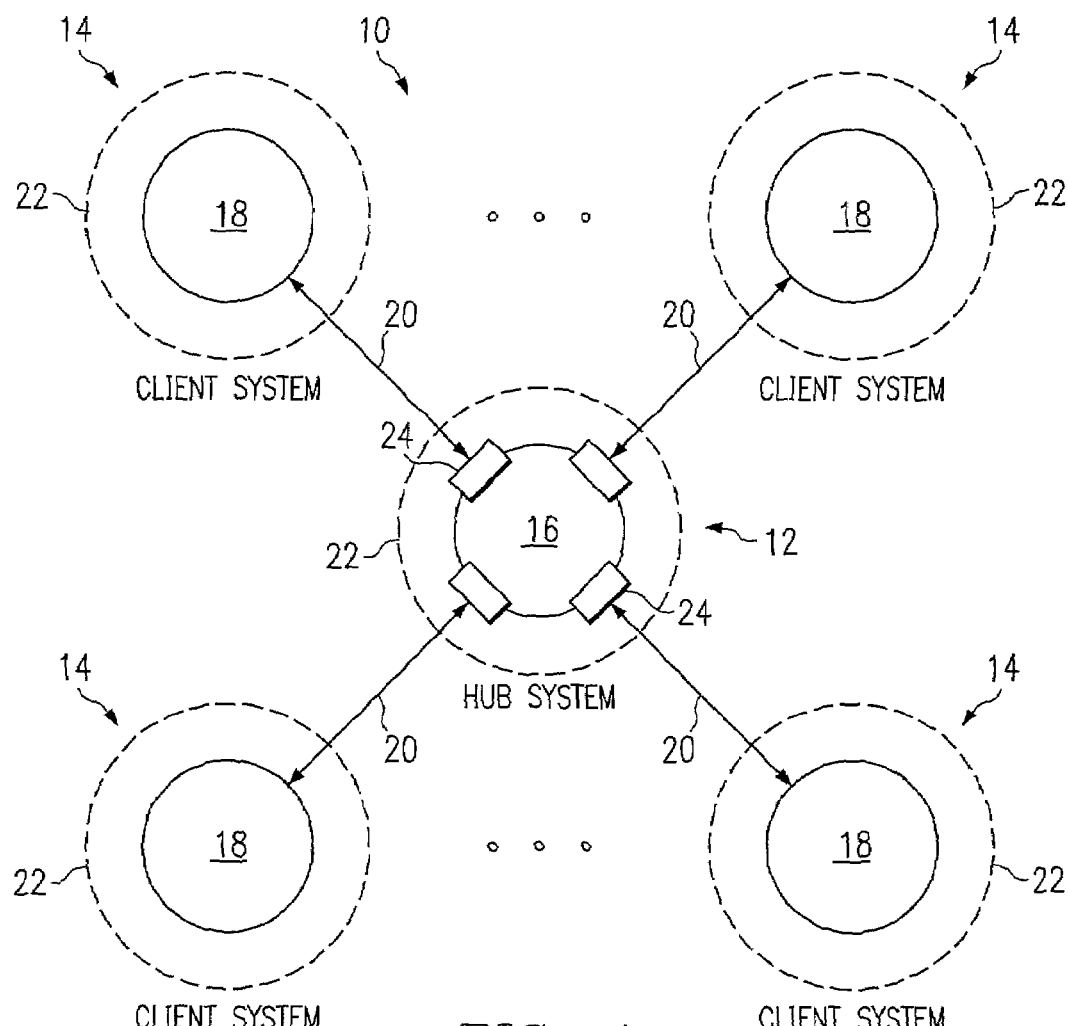
FIG. 1 illustrates an example hub system in communication with one or more remote systems in a distributed network environment using a network API.

FIG. 1 illustrates an example hub system 12 in communication with one or more remote systems 14 in a distributed network environment. Hub system 12 includes a hub server complex 16 that communicates with one or more clients 18 using API-based communications over links 20. Links 20 may include one or more local area networks (LANs), metropolitan area networks (MANs), wide area networks (WANs), portions of a global computer network such as the Internet, or any other wireline, optical, wireless, or other links. In one embodiment, the hub system 12 is associated with a B2C, B2B, or other electronic marketplace and the client systems 14 may be associated with one or more remote electronic marketplaces, one or more remote servers, one or more remote applications (such as legacy or other enterprise systems), or any other remote entities that access the resources of or otherwise communicate with hub system 12. Such remote entities may be referred to as clients 18 of hub server 12. Hub system 12 and client systems 14 may include firewalls 22 that protect the resources of hub server complex 16 and clients 18, respectively.

In general, the network API associated with hub system 12 operates to expose a hub API associated with hub server complex 16 to clients 18, and to provide clients 18 with access to associated publish and subscribe event capabilities, via the Internet or other links 20. The network API may also provide a document exchange capability that allows for bulk transaction interaction between clients 18 and hub server complex 16. In one embodiment, all clients 18 behave similarly from the perspective of hub server complex 16. Hub system 12 includes one or more API adapters 24 suitable for translating the one or more API formats used by clients 18 to a format appropriate for the hub API, each such format preferably having a corresponding API adapter 24. As described more fully below, each API adapter 24 is able to build hub API commands from network API requests and build network API responses from the corresponding hub API replies. For certain embodiment, even asynchronous hub API requests may require minimal response to client 18 indicating that the request was received.

The components of hub system 12 may operate on one or more computers at one or more locations. One or more computers associated with hub system 12 may share processing, data storage, or other suitable resources. For example, hub server complex 16 may include one or more server computers that support one or more applications, modules, engines, programs, or any other software components suitable to provide the features and operation described herein. As a more particular example where the hub server complex 16 is associated with an electronic marketplace, the applications supported by hub server complex 16 may include service applications, order capture applications, and order management applications. Service applications may include a catalog application, a pricing application, a contract application, a user profile application, or any other appropriate application relating to the services that hub system 12 provides to clients 18 acting as buyers. Order capture applications may include an ordering application, an auction application, a requisition application, a procurement application, or any other suitable application relating to handling of orders received from these clients 18. Order management applications may include an order administration application, a returns management application, a settlement application, or any other suitable application relating to the management of orders. However, as described above, the present invention may be incorporated into any suitable hub system 12 according to particular needs.

One or more clients 18 may not be "Internet aware" or might otherwise be incapable of participating in marketplace transactions with hub system 12, absent particular accommodations. In one embodiment, the network API associated with hub system 12 provides one or more of the following features, without limitation: (1) the ability to execute "document-based" or other asynchronous API calls as well as "function based" or other synchronous API calls; (2) the ability to receive and return values for API calls, as well as exception and deprecation notices; (3) support for multiple formats for describing API calls, such as XML, EDI, relational, serialized object (e.g., JAVA), or other appropriate formats; (4) support for Hypertext Transport Protocol (HTTP) tunneling for traversing firewalls 22; (5) guaranteed execution of API calls (i.e. guaranteed message delivery); (6) versioning support; and (7) secure API calls. Any of these or other features may contribute to the ability of hub system 12 to integrate multiple disparate clients 18 in a generic manner and directly interact with such clients 18 without implementing interaction or communication protocols tailored specially for each client 18. For example, the network API of hub system 12 may expose planning and collaborative engine capabilities of hub system 12 to client integrators in a standard fashion. The network API may also allow bulk transaction interaction to be dealt with in a more efficient manner.

In one embodiment, communications may be initiated from client systems 14 to hub system 12, which may provide a level of security to client systems 14 because no inbound connections will be required and no ports in associated firewalls 22 will need to be opened for communication with hub system 12. Instead, hub system 12 maintains one or more open ports in its firewall 22 for communication with client systems 14. Where client system 14 is a remote hub system 12, both hub systems 12 will have open ports to service normal requests, such that the same port may be used for communication between these hub systems 12. Secure HTTP (HTTPS) may be used as the transport layer for exchanging information between hub system 12 and client systems 14, providing the benefit of a widely accepted mechanism, allowing "tunneling" through various types of security firewall arrangements, and providing other features described herein. As described below, hub server complex 16 of hub system 12 may include a Secure Socket Layer (SSL) enabled HTTPS web server to provide communication with client systems 14.

Figure 2:
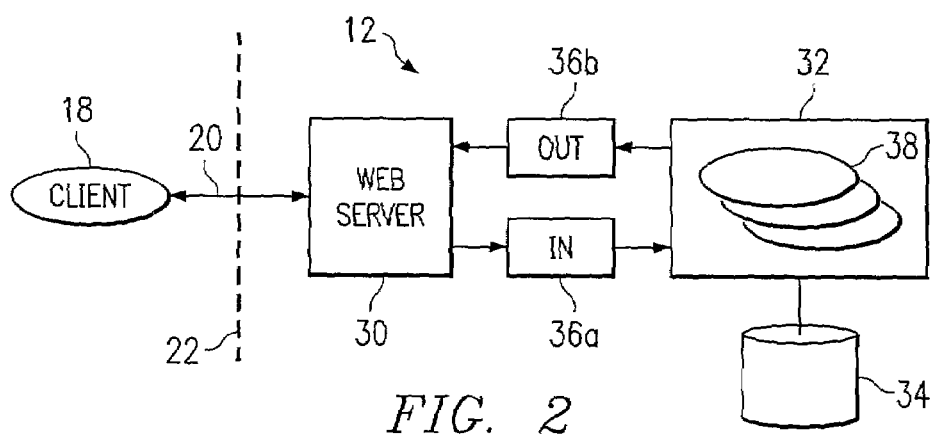
FIG. 2 illustrates an example hub system in further detail.

FIG. 2 illustrates an example hub system 12 in which hub server complex 16 includes one or more HTTPS or other suitable web servers 30, one or more hub application servers 32, and one or more databases 34. Inbound and outbound event queues 36a and 36b, respectively, contain events (or transition notices reflecting the events) to be communicated from web server 30 to hub application server 32 or from hub application server 32 to web server 30, respectively. Hub application server 32 supports one or more applications 38 that provide functionality desired by the clients 18 accessing hub system 12. Hub application server 32 may support, for example, a collaborative planning application 38 that accesses data stored in database 34, which may be based on demand forecast data, available-to-promise (ATP) data, inventory data, or other suitable data received from the enterprise applications of clients 18, to provide collaborative planning for at least a portion of a supply chain that includes these clients 18. However, the present invention contemplates hub system 12 with any appropriate hub application server 32, associated applications 38, and associated database 34 in accordance with particular needs.

In one embodiment, the functionality of applications 38 that execute in hub application server 32 may be represented as business object each having a particular state at any given time. When an action is performed on a business object, it changes state. This transition can be considered an event that is of interest to an appropriate event handler associated with event queues 36. In general, applications 38 may post transition notices to event queue 36 and event handlers may access event queue 36 to consume associated events as appropriate. In a particular embodiment, these event handlers may be of three types: (1) transient, (2) persistent, and (3) guaranteed. The transient type is for events that if lost are not critical, such as informational events which are not persisted and therefore could be lost if system shutdown occurs. The transient event mechanism is a fast memory based approach. Persistent events are stored in database 34 for removal by a persistent event handler upon consumption. The persistent event handler takes full responsibility for properly delivering the event to its consumer. The guaranteed event mechanism implements guaranteed delivery semantics, by which a guaranteed handler will converse with the event framework to achieve guaranteed delivery of the event to its consumer. Although particular event handling strategies are described, the present invention contemplates any appropriate technique for communicating events (or transition notices reflecting events) between hub application server 32 and consumers of the events.

Occasionally, clients 18 may wish to receive notification of any interesting occurrences by way of an active push from hub system 12 to their client systems 14. Clients 18 may be running diverse event consumption technologies (e.g., HTTP, e-mail, etc.). In one embodiment, pre-built event consumers may be provided when a proprietor of hub system 12 provides certain spoke technology or hub technology on the client side. For any clients 18 that have specific implementations, specific push mechanisms may need to be built. As noted above, for easier firewall transversal and easier deployment, the push mechanism is preferably used only if client 18 objects to using a polling mechanism for event notification. A pattern may be defined to allow development of appropriate push client mechanisms.

Figure 3:
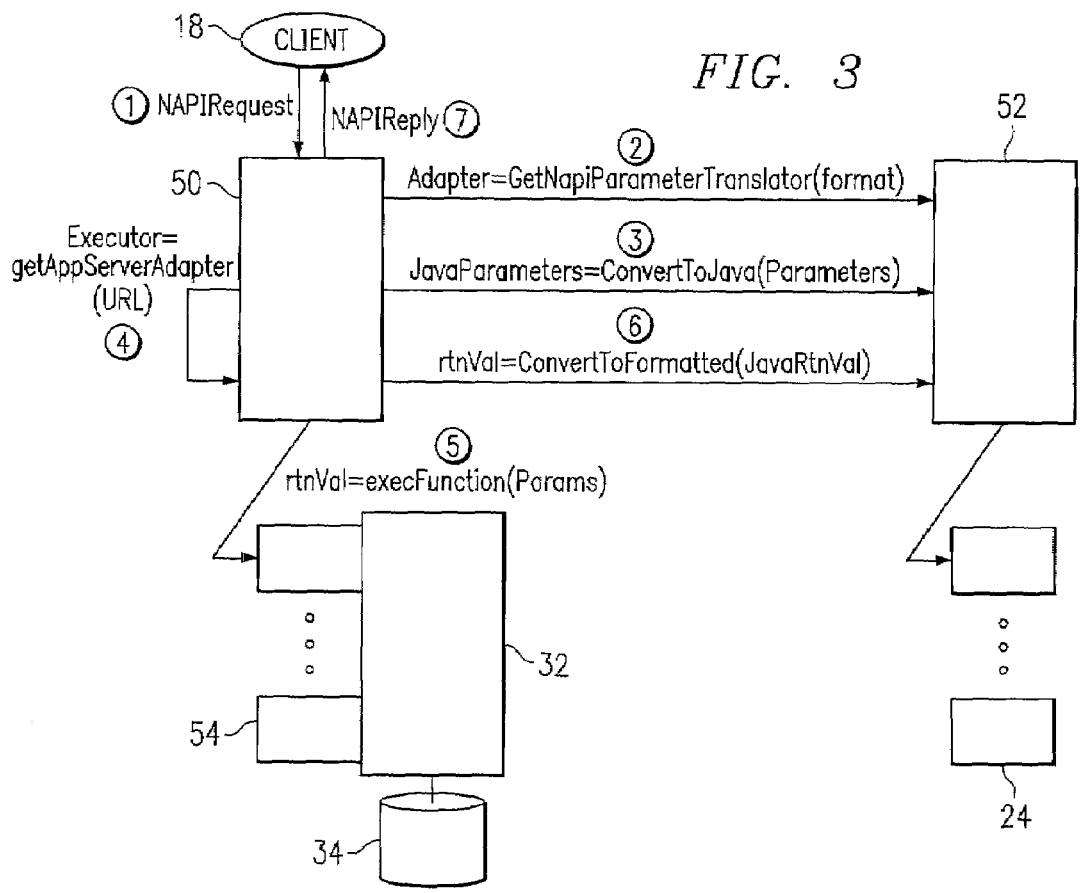
FIG. 3 illustrates an example request-response protocol associated with a network API.

FIG. 3 illustrates an example request-response protocol associated with the network API supported by hub system 12. In one embodiment, a servlet running in web server 30 acts as a request broker 50 to provide translation between network API (NAPI) and hub API (HAPI) commands. Request broker 50 receives a NAPI request contained within an HTTP request, interprets the format of the wrapper that contains the NAPI request (e.g., Multi-purpose Internet Mail Extensions (MIME)), determines the format in which the one or more parameters of the NAPI request are represented (e.g., XML, EDI, serialized object (JAVA), relational, etc.), selects an appropriate adapter 24 for the NAPI request based on the format of the parameters, and passes the parameters to the selected adapter 24 in their native format using an adapter interface 52. In one embodiment, as is shown, passing the parameters to the selected adapter 24 involves request broker 50 calling a method on adapter interface 52 to get adapter 24 and then calling a method on adapter interface 52 to pass the parameters to adapter 24. Adapter 24 converts the formatted parameters to JAVA classes or any other representation suitable for processing at hub application server 32, according to the implementation.

Request broker 50 may select an appropriate application server adapter 54 for hub application server 32, according to the application 38 to be used to handle the NAPI request, and passes the parameters (now converted to JAVA classes according to the particular implementation) to selected application server adapter 54. In one embodiment, as is shown, passing the parameters to the selected application server adapter 54 involves request broker 50 calling a method on request broker 50 to get a Uniform Resource Locator (URL) or other address of application server adapter 54 and then calling a method on application server adapter 54 to pass the parameters to application server adapter 54. Request broker 50 obtains an appropriate return value in response to calling the method in application server adapter 54, the return value reflecting processing of the parameters by an appropriate application 38 running on hub application server 32. Request broker 50 gives the return value (represented in JAVA classes according to the particular implementation) to the selected adapter 24, which then returns a return value in the same format as the original NAPI request. In one embodiment, as is shown, giving the return value adapter 24 involves calling a method on adapter 24. Request broker 50 generates a NAPI response containing the return value, wraps the NAPI response and associated return value in an appropriate wrapper (e.g., a MIME wrapper), and communicates an HTTP response containing the wrapped NAPI response and associated return value to client 18. For document-based or batch-based modes, the same mechanism may be followed, except that the NAPI request is typically a "saveDocumentAndProcess" type request. This is the mechanism that is preferably used for upload/download capabilities that hub system 12 may use.

Because the mechanism described above waits until a return value is received from the final recipient of the NAPI request (i.e. selected application server adapter 54) before communicating any response to the originator of the NAPI request (i.e. client 18), a level of guaranteed messaging may be achieved. In one embodiment, client 18 will know upon receiving the NAPI response that the final recipient has in fact received the API call. However, the possibility exists that if the connection between client 18 and web server 30 is dropped after the method is executed, but before an associated reply is received by client 18, duplicate delivery of the API call may occur. Due to the behavior of request broker 50, guaranteed message delivery can be achieved such that request broker 50 recognizes any duplicate delivery and handle it accordingly. If client 18 does not receive a NAPI response to its request, client 18 may assume that request broker 50 has not received the request and that client 18 may resubmit the request until an appropriate response is received. If there is a failure in submitting the request, either client 18 will receive an error notification or its connection with the web server 30 will be dropped. This provides a proper indication to client 18 that its request was not delivered and should be re-attempted. If the transmission of the response fails, client 18 will not receive the response or its connection will be dropped, and client 18 will know that another attempt to deliver the request should occur.

As the above description makes clear, communication between request broker 50 and client 18 involves a request-response protocol. Method execution in other environments would typically involve a client 18 calling a method and expecting a return type generated by the request. The same scenario exists in the environment of system 10, except that the method is instead executed remotely from client 18 (e.g., by application server adapter 54 of hub system 12) with link 20 (e.g., the Internet) being the mechanism to communicate information between the caller of the method (client 18) and the executor of the method (application server adapter 54).

When the duration of a method invocation (i.e. message passing) is relatively large (e.g., large file upload, long computational method, etc.), an asynchronous (i.e. document-based) invocation semantic is preferably used to avoid tying up network connections, database connections, and other resources for long periods. This also helps avoid clients 18 having to "block" or otherwise suspend communications for a long period and potentially timing out. When the duration of a method invocation is relatively small, either an asynchronous or synchronous (function-based) invocation semantic may be employed. In general however, a synchronous mode is preferred over an asynchronous mode because coding of components of hub system 12 and client systems 14 may be simpler in the synchronous case.

In one embodiment, request broker 50 may maintain an access control list to prevent unauthorized execution of methods. Client 18 may be required to connect to web server 30 with a username and a password, which controls general access to the resources of hub system 12. In addition, the access control list may specify all the methods that may be executed within hub system 12. Where access to at least some methods is restricted to certain clients 18, the access control list may further specify which methods are accessible to which clients 18. If access to a particular method, generally or by a particular client 18, is not specified in the access control list, the method will not be executed.

Figure 4:
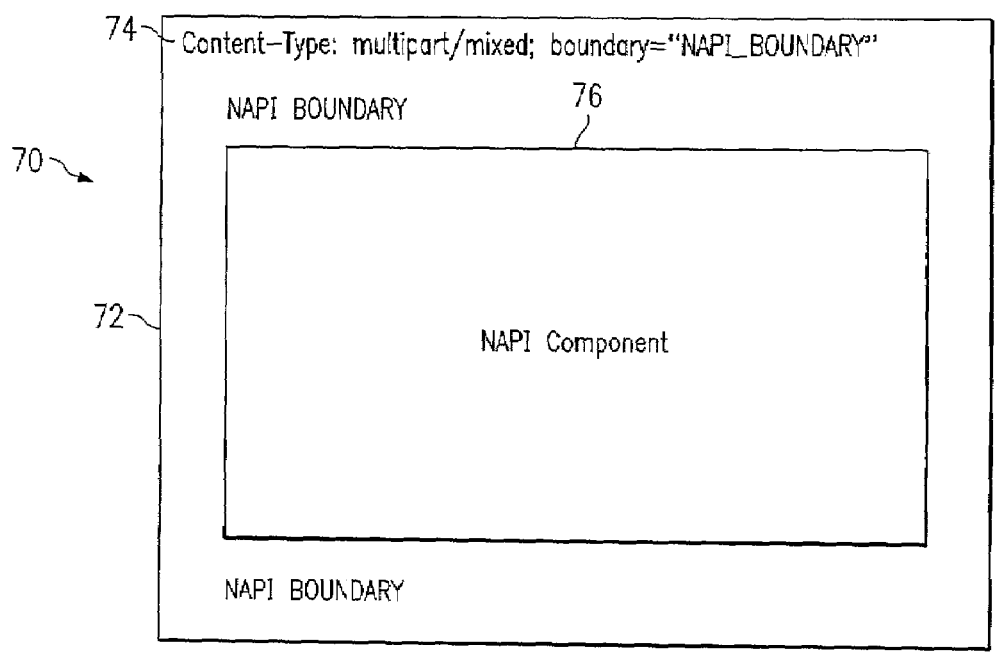
FIG. 4 illustrates an example network API message format.
Figure 6:
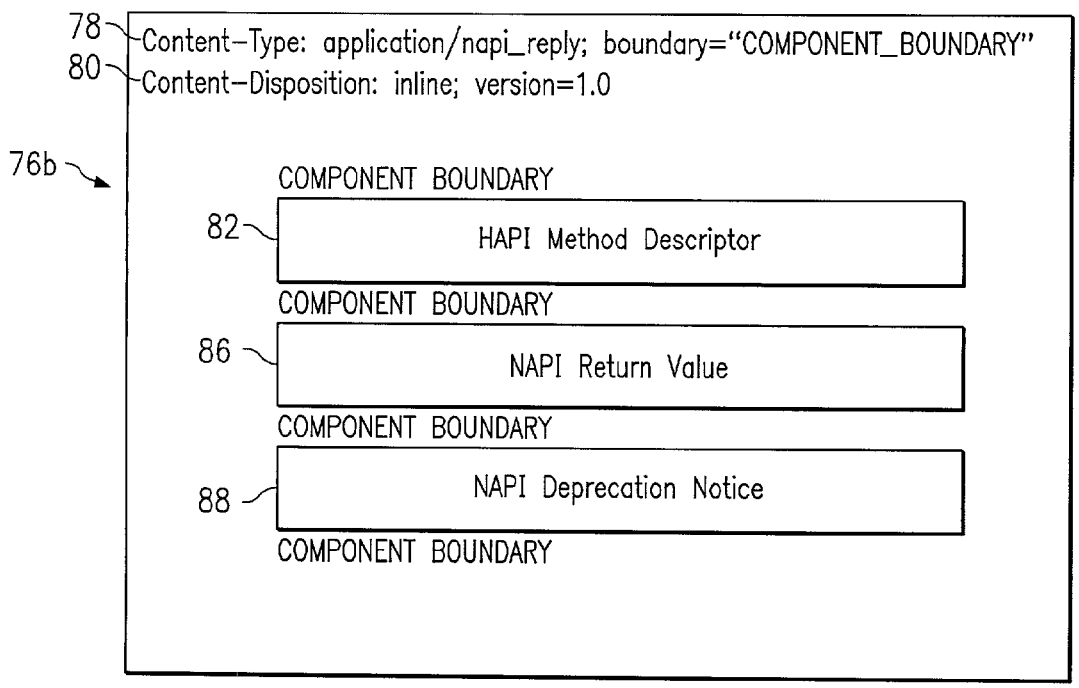
FIG. 6 illustrates an example network API reply component.
Figure 7:
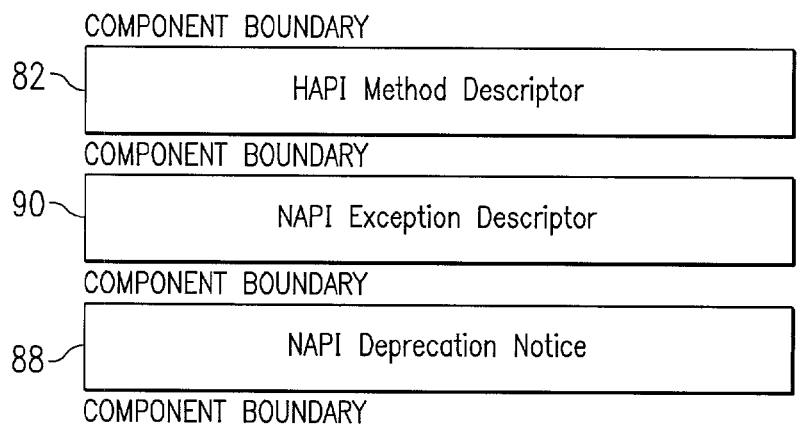
FIG. 7 illustrates an example network API exception-report component.

FIG. 4 illustrates an example network API (NAPI) message format 70, which in one embodiment includes a MIME envelope 72 having a content type 74 set to multipart/mixed and including a boundary definition, and a NAPI component 76. NAPI component 76 may be request component 76*a* (as illustrated in FIG. 5), a response component 76*b* (as illustrated in FIG. 6), an exception component 76*c* (as illustrated in FIG. 7), or any other suitable component 74.

Figure 5:
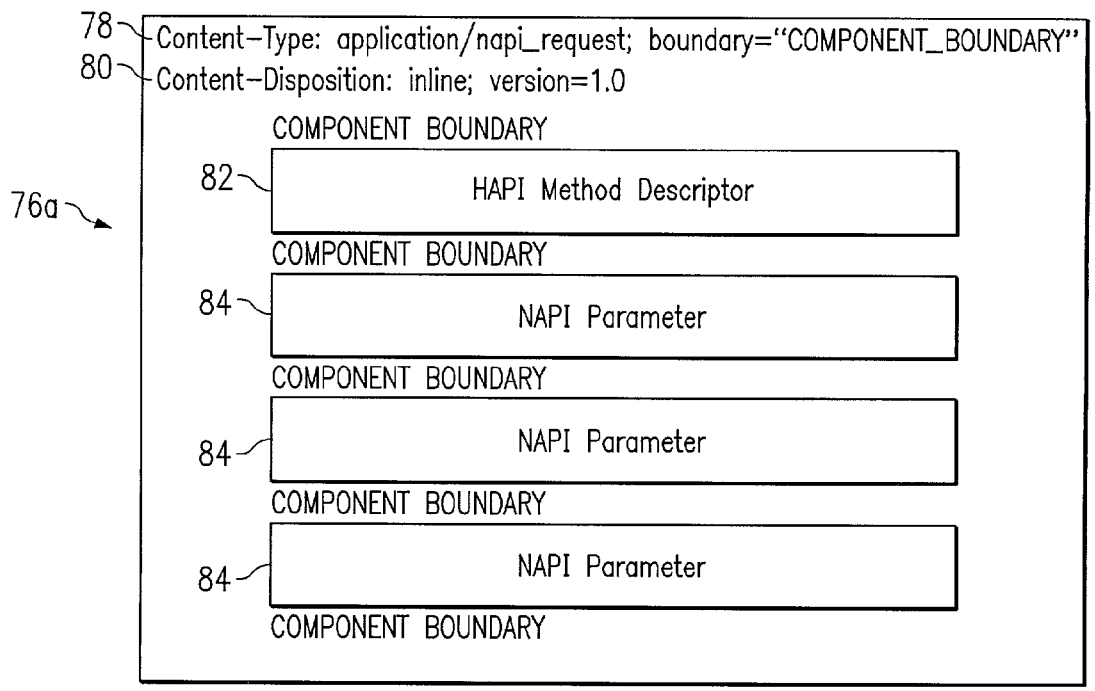
FIG. 5 illustrates an example network API request component.

FIG. 5 illustrates an example NAPI request component 76*a* received at hub system 12 from a client 18. In one embodiment, request component 76*a* may include a NAPI request content type 78 including a boundary definition, a content disposition 80 including a NAPI version, a hub API (HAPI) descriptor 82 including a description of the HAPI method to call, and one or more NAPI parameters 84 used to execute the called method. The format for parameters 84 defines which adapter 24 will be chosen to interpret the request and to build the corresponding reply for the session. As described above, for example, the format may be XML, EDI, serialized object (e.g., JAVA), relational, or any other suitable format according to particular needs. Parameters 84 are preferably (and in one embodiment must be) given in the order the parameters 84 appear in the method call. If no parameters 84 exist in the method signature, then request component 76*a* will not include any parameters 84 in addition to descriptor 82.

An example request component 76*a* may be defined as follows:

---

Content-Type: multipart/mixed; boundary="NAPI_BOUNDARY"
--NAPI_BOUNDARY
Content-Type: application/napi-request;
boundary="COMPONENT_BOUNDARY"
Content-Disposition: inline; version=1.0
---COMPONENT_BOUNDARY
Content-Type: application/napi-method
Content-Disposition: inline
AccessorURL=urlName
MethodName=methodName
--COMPONENT_BOUNDARY
Content-Type: application/napi-parameter
Content-Transfer-Encoding: base64
Content-Disposition: inline; format_type="JAVA"
0M8R4KGxGuEAAAAAAAAAAAAAAAAA
AAANwAAAAEAAAD+////AAAAADQAAAD
/////////////////////////////////////////////////
/////////////////////////////////////////////////
/////////////////////////////////////////////////
/////////////////////////////////////////////////
/////////////////////////////////////////////////
--COMPONENT_BOUNDARY

---

-continued

Content-Type: application/napi-parameter
Content-Transfer-Encoding: base64
Content-Disposition: inline; format_type="JAVA"
0M8R4KGxGuEAAAAAAAAAAAAAAAAA
AAANwAAAAEAAAD+////AAAAADQAAAD
/////////////////////////////////////////////////
/////////////////////////////////////////////////
/////////////////////////////////////////////////
/////////////////////////////////////////////////
/////////////////////////////////////////////////
--COMPONENT_BOUNDARY--
--NAPI_BOUNDARY--

---

FIG. 6 illustrates an example NAPI reply component 76*b* communicated from hub system 12 to client 18. In one embodiment, reply component 76*b* may include a NAPI reply content type 78 that includes a boundary definition, a content disposition 80 that includes a NAPI version, a HAPI descriptor 82 that includes a description of the HAPI method called, and a NAPI return value 86 from executing the method. The format field of the return value 86 will preferably describe how to interpret the return value 86, corresponding to the adapter 24 that was used. Where appropriate, reply component 76*b* may include a deprecation notice 88 that indicates to the calling client 18 that the called method should not be further used.

An example reply component 76*b* may be defined as follows:

---

Content-Type: multipart/mixed; boundary="NAPI_BOUNDARY"
--NAPI_BOUNDARY
Content-Type: application/napi-reply;
boundary="COMPONENT_BOUNDARY"
Content-Disposition: inline; version=1.0
AccessorURL=urlName
MethodName=methodName
--COMPONENT_BOUNDARY
Content-Type: application/napi-return-value;
Content-Transfer-Encoding: base64
Content-Disposition: inline; format="JAVA"
0M8R4KGxGuEAAAAAAAAAAAAAAAAA
AAANwAAAAEAAAD+////AAAAADQAAAD
/////////////////////////////////////////////////
/////////////////////////////////////////////////
/////////////////////////////////////////////////
/////////////////////////////////////////////////
/////////////////////////////////////////////////
--COMPONENT_BOUNDARY--
--NAPI_BOUNDARY--

---

An example reply component 76*a* with an attached deprecation notice 88 may be defined as follows:

---

Content-Type: multipart/mixed; boundary="NAPI_BOUNDARY"
--NAPI_BOUNDARY
Content-Type: application/napi-reply;
boundary="COMPONENT_BOUNDARY"
Content-Disposition: inline; version=1.0
AccessorURL=urlName
MethodName=methodName
--COMPONENT_BOUNDARY
Content-Type: application/napi-return-value;
Content-Transfer-Encoding: base64
Content-Disposition: inline; format="JAVA"
0M8R4KGxGuEAAAAAAAAAAAAAAAAA
AAANwAAAAEAAAD+////AAAAADQAAAD
/////////////////////////////////////////////////
/////////////////////////////////////////////////

-continued

```
/////////////////////////////////////////////////////////////
/////////////////////////////////////////////////////////////
/////////////////////////////////////////////////////////////
--COMPONENT_BOUNDARY
Content-Type: application/napi-deprecation-notice;
This method has been deprecated.
--COMPONENT_BOUNDARY--
--NAPI_BOUNDARY--
```

FIG. 7 illustrates an example NAPI exception component 76c that might be communicated from hub system 12 to client 18. In one embodiment, exception component 76c may include a NAPI exception-report content type 78 that includes a boundary definition, a content disposition 80 that includes a NAPI version, a HAPI descriptor 82 that includes a description of the HAPI method called, and a NAPI exception descriptor 90 that includes description of the exception that occurred. As for reply component 76b described above, where appropriate, exception component 76c may include a deprecation notice 88 indicating to the calling client 18 that the called method should not be further used.

An example exception component 76c may be defined as follows:

```
Content-Type: multipart/mixed; boundary="NAPI_BOUNDARY"
--NAPI_BOUNDARY
Content-Type:application/napi-exception-report;
boundary="COMPONENT_BOUNDARY"
Content-Disposition: inline; version=1.0
AccessorURL=urlName
MethodName=methodName
--COMPONENT_BOUNDARY
Content-Type: text/plain;
Application threw exception:"Reason for exception being thrown"
--COMPONENT_BOUNDARY--
--NAPI_BOUNDARY--
```

An example exception component 76c with an attached deprecation notice 88 may be defined as follows:

```
Content-Type: multipart/mixed; boundary="NAPI_BOUNDARY"
--NAPI_BOUNDARY
Content-Type:application/napi-exception-report;
boundary="COMPONENT_BOUNDARY"
Content-Disposition: inline; version=1.0
AccessorURL=urlName
MethodName=methodName
--COMPONENT_BOUNDARY
Content-Type: text/plain;
Application threw exception:"Reason for exception being thrown"
--COMPONENT_BOUNDARY
Content-Type: application/napi-deprecation-notice;
This method has been deprecated.
--COMPONENT_BOUNDARY--
--NAPI_BOUNDARY--
```

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented system for facilitating communication in a distributed network environment, the system comprising:
   a request broker, implemented as a servlet operating at a Secure Hypertext Transport Protocol (HTTPS) web server within a hub system, operable to:
   receive a network application program interface (API) request component from one or more clients within the distributed network environment, the one or more clients located remote from the hub system, the network API request component comprising a description of a system API method to be called and one or more parameters to be used in executing the system API method, the parameters having one of a plurality of acceptable native formats, wherein the plurality of acceptable native formats comprise formats selected from the group consisting of Extensible Markup Language (XML), Electronic Data Interchange (EDI), and serialized object formats;
   determine the native format of the parameters;
   communicate the parameters in the native format to a selected one of a plurality of translators for translation of the parameters from the native format to an internal format wherein the internal format comprises serialized object format, each translator being associated with a different native format and the parameters being converted into serialized object classes by the selected translator; and
   communicate the parameters in the internal format to an application server within the hub system, to enable execution of the system API method according to the parameters; and
   the application server system, operable to receive the parameters from the request broker in the internal format, generate a return value reflecting execution of the system API method according to the parameters, and communicate the return value to the request broker in the internal format;
   the request broker further operable to receive the return value from the application server system in the internal format, communicate the return value in the internal format to the selected translator for translation of the return value from the internal format to the native format, generate a network API reply component that comprises the description of the system API method that was called and the return value in the native format, and communicate the network API reply component to the one or more clients; and
   a system firewall having a plurality of ports, the system maintaining at least one port of the system firewall open for communication with the one or more clients, the one or more clients initiating a connection to the system through the at least one open port of the system firewall to communicate the network API request component to the request broker, independent of any port of a client firewall being open for communication with the system.

2. The system of claim 1, wherein:
   the network API request and network API reply components comprise Multi-purpose Internet Mail Extension (MIME) containers communicated over the Internet in HTTPS messages.

3. The system of claim 1, wherein the one or more clients comprise at least one of a remote application, a remote spoke, and a remote hub system.

4. The system of claim 1, wherein the request broker is a component of an electronic marketplace, the one or more clients are remote from the electronic marketplace, and the one or more clients comprise at least one of a remote enterprise application, a remote spoke, and a remote electronic marketplace.

5. The system of claim 1, wherein the system API method is called using a synchronous method invocation semantic.

6. The system of claim 1, wherein the application server system comprises an application server and a plurality of associated adapters, the request broker communicating the parameters in the internal format to a selected one of the plurality of adapters to enable execution of the system API method according to the parameters, the selected adapter being operable to:
receive the parameters from the request broker in the internal format;
communicate the parameters to the application server in the internal format for execution of the system API method according to the parameters;
receive the return value from the application server reflecting execution of the system API method according to the parameters; and
communicate the return value to the request broker in the internal format.

7. The system of claim 1, wherein the application server system supports one or more applications comprising at least a collaborative planning application operable to provide planning data for one or more clients within a supply chain.

8. The system of claim 1, wherein the network API request component and network API reply component each comprise a version identifier indicating the version of the network API request component and network API reply component being used.

9. The system of claim 1, wherein the network API reply comprises a format field describing how to interpret the return value and corresponding to the selected translator.

10. The system of claim 1, wherein the network API reply comprises a deprecation notice indicating to the one or more clients that the system API method that was called should not be further used.

11. The system of claim 1, wherein the request broker is further operable to generate a network API exception component based on an exception occurring in connection with execution of a second system API method called based on a network API request component received from a second client, the network API exception component comprising a description of the second system API method, a description of the exception, and a deprecation notice indicating to the second client that the second system API method should not be further used.

12. A computer-implemented method for facilitating communication in a distributed network environment, the method comprising:
receiving a network application program interface (API) request component at a request broker implemented as a servlet operating at a Secure Hypertext Transport Protocol (HTTPS) web server within a hub system from one or more clients within the distributed network environment, the one or more clients located remote from the hub system, the network API request component comprising a description of a system API method to be called and one or more parameters to be used in executing the system API method, the parameters having one of a plurality of acceptable native formats, wherein the acceptable native formats comprise formats selected from the group consisting of Extensible Markup Language (XML), Electronic Data Interchange (EDI), and serialized object formats;
determining the native format of the parameters at the request broker;
communicating the parameters in the native format from the request broker to a selected one of a plurality of translators for translation of the parameters from the native format to an internal format wherein the internal format comprises serialized object format, each translator being associated with a different native format and the parameters being converted into serialized object classes by the selected translator;
communicating the parameters in the internal format from the request broker to an application server system within the hub system, to enable execution of the system API method according to the parameters;
receiving a return value at the request broker from the application server system in the internal format;
communicating the return value from the request broker to the selected translator for translation of the return value from the internal format to the native format;
generating a network API reply component at the request broker comprising the description of the system API method that was called and the return value in the native format;
communicating the network API reply component from the request broker to the one or more clients;
maintaining at least one of a plurality of ports of a system firewall open for communication with the one or more clients; and
accepting a connection initiated by the one or more clients through the at least one open port of the system firewall to allow the one or more clients to communicate the network API request component to the request broker, independent of any port of a client firewall being open for communication.

13. The method of claim 12, wherein:
the network API request and network API reply components comprise Multi-purpose Internet Mail Extension (MIME) containers communicated over the Internet in HTTPS messages.

14. The method of claim 12, wherein the one or more clients comprise at least one of a remote application, a remote spoke, and a remote hub system.

15. The method of claim 12, wherein the request broker is a component of an electronic marketplace, the one or more clients are remote from the electronic marketplace, and the one or more clients comprise at least one of a remote enterprise application, a remote spoke, and a remote electronic marketplace.

16. The method of claim 12, further comprising calling the system API method using a synchronous method invocation semantic.

17. The method of claim 12, wherein:
the application server system comprises an application server and a plurality of associated adapters; and
the method comprises communicating the parameters in the internal format from the request broker to a selected one of the plurality of adapters to enable execution of the system API method according to the parameters, communicating the parameters from the selected adapter to the application server in the internal format for execution of the system API method according to the parameters, receiving at the selected adapter the return value from the application server reflecting execution of the system API method according to the parameters, and communicating the return value from the selected adapter to the request broker in the internal format.

18. The method of claim 12, wherein the application server system supports one or more applications comprising at least a collaborative planning application operable to provide planning data for one or more clients within a supply chain.

19. The method of claim 12, wherein the network API request component and network API reply component each comprise a version identifier indicating the version of the network API request component and network API reply component being used.

20. The method of claim 12, wherein the network API reply comprises a format field describing how to interpret the return value and corresponding to the selected translator.

21. The method of claim 12, wherein the network API reply comprises a deprecation notice indicating to the one or more clients that the system API method that was called should not be further used.

22. The method of claim 12, further comprising generating a network API exception component at the request broker based on an exception that has occurred in connection with execution of a second system API method called based on a network API request component received from a second client, the network API exception component comprising a description of the second system API method, a description of the exception, and a deprecation notice indicating to the second client that the second system API method should not be further used.

23. A computer-implemented system for facilitating communication in a distributed network environment, the system comprising:

means for receiving a network application program interface (API) request component at a request broker implemented as a servlet operating at a Secure Hypertext Transport Protocol (HTTPS) web server within a hub system from one or more clients within the distributed network environment, the one or more clients located remote from the hub system, the network API request component comprising a description of a system API method to be called and one or more parameters to be used in executing the system API method, the parameters having one of a plurality of acceptable native formats;

means for determining the native format of the parameters at the request broker;

means for communicating the parameters in the native format from the request broker to a selected one of a plurality of translators for translation of the parameters from the native format to an internal format wherein the internal format comprises serialized object format, each translator being associated with a different native format and the parameters being converted into serialized object classes by the selected translator;

means for communicating the parameters in the internal format from the request broker to an application server system within the hub system, to enable execution of the system API method according to the parameters;

means for receiving a return value from the application server system at the request broker reflecting execution of the system API method according to the parameters;

means for communicating the return value in the internal format from the request broker to the selected translator for translation of the return value from the internal format to the native format;

means for generating a network API reply component at the request broker comprising the description of the system API method that was called and the return value in the native format;

means for communicating the network API reply component from the request broker to the one or more clients;

means for maintaining at least one of a plurality of ports of a system firewall open for communication with the one or more clients; and means for accepting a connection initiated by the one or more clients through the at least one open port of the system firewall to allow the one or more clients to communicate the network API request component to the request broker, independent of any port of a client firewall being open for communication.

* * * * *